US010236971B2

(12) United States Patent
Ui et al.

(10) Patent No.: US 10,236,971 B2
(45) Date of Patent: Mar. 19, 2019

(54) COMMUNICATION APPARATUS FOR CONTROLLING IMAGE COMPRESSION AND CONTROL METHOD THEREFOR

(71) Applicant: CANON KABUSHIKI KAISHA, Tokyo (JP)

(72) Inventors: Yutaka Ui, Yokohama (JP); Hiroichi Yamaguchi, Sagamihara (JP); Kazuki Takemoto, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 34 days.

(21) Appl. No.: 15/172,684

(22) Filed: Jun. 3, 2016

(65) Prior Publication Data
US 2016/0358381 A1 Dec. 8, 2016

(30) Foreign Application Priority Data
Jun. 5, 2015 (JP) .................................. 2015-115035

(51) Int. Cl.
*G06T 19/00* (2011.01)
*H04N 19/164* (2014.01)
(Continued)

(52) U.S. Cl.
CPC ................. *H04B 7/26* (2013.01); *G06T 9/00* (2013.01); *H04N 21/2402* (2013.01);
(Continued)

(58) Field of Classification Search
CPC .......... G06T 9/00; H04B 7/26; H04N 19/115; H04N 19/164
(Continued)

(56) References Cited

U.S. PATENT DOCUMENTS

2007/0242086 A1* 10/2007 Tsujimoto ............. G06T 19/006
345/632
2010/0150454 A1* 6/2010 Sunahara ............... H04N 19/70
382/218
(Continued)

FOREIGN PATENT DOCUMENTS

JP 2010-258850 A 11/2010

*Primary Examiner* — Jin Cheng Wang
(74) *Attorney, Agent, or Firm* — Carter, DeLuca, Farrell & Schmidt LLP (57) ABSTRACT

To provide a technique capable of reducing the transmission delay of an image, a communication apparatus wirelessly communicable with another communication apparatus, receives a compressed captured image from the other communication apparatus; decompresses the compressed captured image to obtain a decompressed captured image; generates, based on the decompressed captured image, a CG image to be superimposed and displayed on the captured image; and compresses the CG image to generate a compressed CG image; transmits the compressed CG image to the other communication apparatus. Then, the communication apparatus derives a delay time based on a transmission time of the compressed captured image in the other communication apparatus and a generation completion time of the CG image; and changes a compression ratio of the CG image based on whether the delay time is longer than a predetermined threshold.

9 Claims, 8 Drawing Sheets (51) Int. Cl.
*H04B 7/26* (2006.01)
*G06T 9/00* (2006.01)
*H04N 21/24* (2011.01)
*H04N 21/2662* (2011.01)
*H04N 21/81* (2011.01)
*H04N 19/115* (2014.01)

(52) U.S. Cl.
CPC ..... H04N 21/2662 (2013.01); H04N 21/8146 (2013.01); *H04N 19/115* (2014.11); *H04N 19/164* (2014.11)

(58) Field of Classification Search
USPC .......................................... 345/473, 632, 633
See application file for complete search history.

(56) References Cited

U.S. PATENT DOCUMENTS

| | | | | |
|---|---|---|---|---|
| 2011/0080942 | A1* | 4/2011 | Nagara | H04L 1/0014 375/240.01 |
| 2013/0063447 | A1* | 3/2013 | Matsui | H04L 67/36 345/473 |
| 2013/0064461 | A1* | 3/2013 | Yoshimura | G06T 9/00 382/232 |
| 2015/0229960 | A1* | 8/2015 | Yamasaki | H04N 19/593 375/240.12 |
| 2015/0371444 | A1 | 12/2015 | Hara et al. | |

\* cited by examiner

COMMUNICATION APPARATUS FOR CONTROLLING IMAGE COMPRESSION AND CONTROL METHOD THEREFOR

BACKGROUND OF THE INVENTION

Field of the Invention

The present invention relates to an image processing technique and, more particularly, to control when wirelessly transmitting an image.

Description of the Related Art

In recent years, there has been known an MR (Mixed Reality) technique of superimposing and displaying a video in a virtual world expressed by a CG (Computer Graphics) image on a video in a real world. As an apparatus which uses the MR technique, there is provided a video see-through type HMD (Head Mounted Display). The video see-through type HMD causes a video camera or the like to capture a video, which nearly coincides with that viewed from a pupil position of an HMD user, and superimposes and displays a CG image on the captured image.

The video see-through type HMD transmits, to an image processing apparatus such as a PC (Personal Computer), an image captured by an image capturing unit mounted in the HMD, and the PC performs the rendering processing of a CG image based on the obtained captured image. The PC transmits the rendered CG image to the HMD, and the HMD displays an image obtained by compositing the captured image and the CG image, thereby allowing the user wearing the HMD to experience an MR space. The rendering processing of the CG image is performed based on the position and orientation information of the HMD. The position and orientation information of the HMD can be obtained based on feature points extracted using markers or natural features in the captured image.

In a wireless MR system in which an HMD and a PC are wirelessly, communicably connected, the HMD wirelessly transmits, to the PC, a captured image and information such as the position and orientation information of the HMD. The PC renders a CG image based on the captured image and the position and orientation information of the HMD, and wirelessly transmits the rendered CG image to the HMD.

Consequently, in the wireless MR system, a delay caused by wireless transmission between the HMD and the PC generates a delay until the MR image is displayed on the HMD after the HMD performs image capturing. The delay time generated by wireless transmission changes depending on the effective transmission rate of wireless communication and the data amounts of the captured image and CG image to be wirelessly transmitted. Furthermore, since the effective transmission rate of wireless communication changes depending on a radio wave propagation environment, the delay time generated by wireless communication always varies. If the delay time is long, there is a large difference between the timing of an actual operation and that of the MR image displayed on the HMD, and thus the user feels an unnatural impression, thereby degrading the feeling of the user as if he/she existed in the MR space.

To cope with this, Japanese Patent Laid-Open No. 2010-258850 (patent literature 1) discloses a technique of calculating a wireless transmission band based on a delay time and packet loss rate between a video transmission terminal and a video reception terminal, and determining a compression ratio in data transmission based on the calculated wireless transmission band.

The delay until the MR image is displayed on the HMD after the HMD performs image capturing can be generated by the rendering processing of the CG image by the PC. The time taken to execute the rendering processing of the CG image changes depending on, for example, the resolution of the CG image to be rendered, the size of the CG image, and the geometrical shape of the CG image.

However, the above-described conventional technique cannot cope with the delay time if the time of the rendering processing of the CG image is long. That is, in the method described in patent literature 1, even if the time of the rendering processing of the CG image is long, if the delay time in wireless transmission is short, it is impossible to reduce the delay time.

SUMMARY OF THE INVENTION

According to one aspect of the present invention, a communication apparatus wirelessly communicable with another communication apparatus, comprises: a reception unit configured to receive, by wireless communication, a compressed captured image obtained by compressing a captured image from the other communication apparatus; a decompression unit configured to decompress the compressed captured image to obtain a decompressed captured image; a CG image generation unit configured to generate, based on the decompressed captured image, a CG image to be superimposed and displayed on the captured image; a compression unit configured to compress the CG image to generate a compressed CG image; a transmission unit configured to transmit the compressed CG image to the other communication apparatus by wireless communication; a deriving unit configured to derive a delay time based on a transmission time of the compressed captured image in the other communication apparatus and a generation completion time of the CG image in the CG image generation unit; and a change unit configured to change a compression ratio of the CG image in the compression unit based on whether the delay time derived by the deriving unit is longer than a predetermined threshold.

The present invention provides a technique capable of reducing the transmission delay of an image.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will be described in detail below with reference to the accompanying drawings. Note that the following embodiments are merely examples and are not intended to limit the scope of the present invention.

(First Embodiment)

An MR system including an HMD and a PC will be exemplified and described below as the first embodiment of a communication system according to the present invention.

<System Arrangement>

Figure 1:
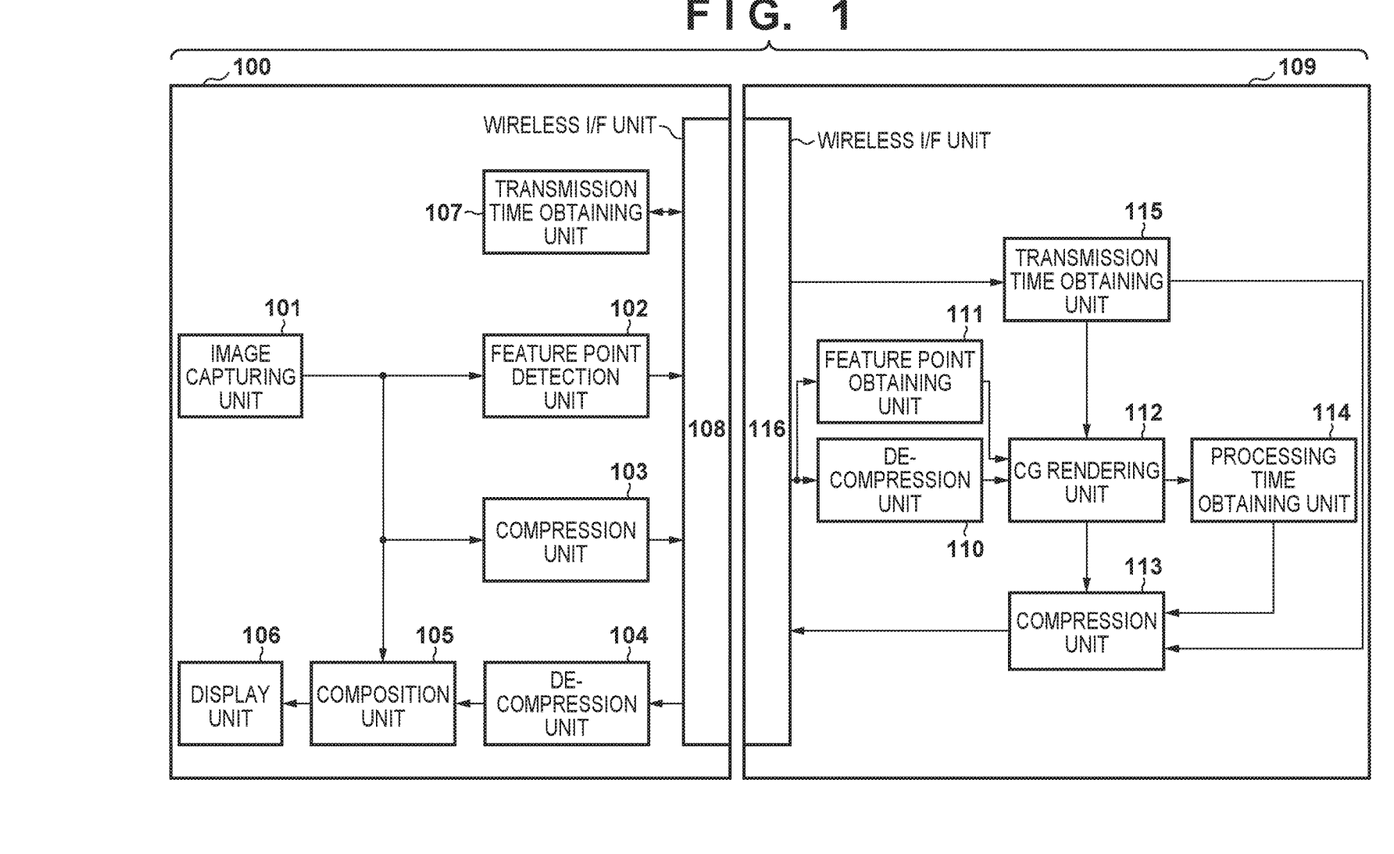
FIG. 1 is block diagram showing the arrangement of an MR system according to the first embodiment.

FIG. 1 is a block diagram showing the arrangement of the MR system according to the first embodiment. The MR system includes a video see-through type head-mounted display (HMD) 100 serving as a display device having an image capturing function, which is worn by a user on the head, and a PC 109 serving as an image processing apparatus for generating a CG image to be superimposed and displayed on a captured image.

Communication between the HMD 100 and the PC 109 is performed via wireless communication between a wireless I/F unit 108 of the HMD 100 and a wireless I/F unit 116 of the PC 109. Although, for example, IEEE802.11ac or IEEE802.11ad as a wireless LAN standard is used as a communication method, other communication methods may be used.

The arrangement of the HMD 100 will be described first. The HMD 100 includes an image capturing unit 101, a feature point detection unit 102, a compression unit 103, a decompression unit 104, a composition unit 105, a display unit 106, a transmission time obtaining unit 107, and the wireless I/F unit 108.

The image capturing unit 101 captures a peripheral environment that nearly coincides with the line of sight of the user wearing the HMD 100. The feature point detection unit 102 detects natural feature points in a captured image obtained by the image capturing unit 101. As a feature point detection technique, for example, well-known FAST (Features from Accelerated Segment Test) can be used. Any other arbitrary feature point detection technique may be used as long as it is possible to detect the coordinates of a feature point image, as a matter of course.

The compression unit 103 performs compression processing for the captured image obtained by the image capturing unit 101 to perform conversion into a compressed captured image. As a compression method, for example, a GIF (Graphics Interchange Format) or JPEG (Joint Photographic Experts Group) method for performing lossy compression for each frame is used. An H.264 method for performing interframe compression or the like is also used. The compression unit 103 may be configured to use a lossless compression method, as a matter of course. The decompression unit 104 decompresses a compressed CG image received from the PC 109 via the wireless I/F unit 108, thereby obtaining a CG image.

The composition unit 105 superimposes, on the image captured by the image capturing unit 101, the CG image having undergone the decompression processing by the decompression unit 104, thereby generating an MR image as a composite image. The display unit 106 displays, on a liquid crystal display (LCD) or the like, the MR image generated by the composition unit 105. The transmission time obtaining unit 107 determines a transmission time TH1 at which the wireless I/F unit 108 transmits the compressed captured image.

The arrangement of the PC 109 will be described next. The PC 109 includes a decompression unit 110, a feature point obtaining unit 111, a CG rendering unit 112, a compression unit 113, a processing time obtaining unit 114, a transmission time obtaining unit 115, and the wireless I/F unit 116.

The decompression unit 110 decompresses the compressed captured image which has been received from the HMD 100 via the wireless I/F unit 116, thereby obtaining a decompressed captured image which nearly coincides with the image captured by the image capturing unit 101 of the HMD 100. The feature point obtaining unit 111 obtains the information of feature points in the captured image which has been received from the HMD 100 via the wireless I/F unit 116. That is, the feature points correspond to those detected by the feature point detection unit 102.

The CG rendering unit 112 generates a CG image based on the captured image obtained by the decompression unit 110 and the feature points obtained by the feature point obtaining unit 111. Although details will be described later, the rendering resolution of the CG image is controlled based on a transmission time obtained by the transmission time obtaining unit 115.

The compression unit 113 performs compression processing for the CG image generated by the CG rendering unit 112, thereby generating a compressed CG image. Although details will be described later, the compression ratio of the CG image is controlled based on a compressed captured image transmission time measured by the transmission time obtaining unit 115 and a CG rendering processing time obtained by the processing time obtaining unit 114.

The processing time obtaining unit 114 measures, for each frame, a CG rendering processing time D2 as a time taken to perform the rendering processing of the CG image, that is, the time from when the rendering processing of the CG image starts until the processing ends. Note that the time taken to perform the rendering processing of the CG image changes depending on the size of the CG image/the geometrical shape of the CG image/the resolution of the CG image.

The transmission time obtaining unit 115 is a functional unit of obtaining the information of the compressed captured image transmission time D1 as the time taken to transmit the compressed captured image from the HMD 100 to the PC 109. Note that a description will be provided by assuming that the HMD 100 and the PC 109 respectively include timers and their times are synchronous with each other. As a time synchronization method, a well-known synchronization method such as NTP (Network Time Protocol) or FTSP (Flooding Time Synchronization Protocol) is preferably used. Although details will be described later, the transmission time obtaining unit 115 measures the compressed captured image transmission time D1 based on the transmission time of the compressed captured image in the HMD 100 and the reception time of the compressed captured image in the PC 109.

Note that the respective functional units 101 to 108 and 110 to 116 shown in FIG. 1 are implemented in the apparatuses as hardware or software. When the functional units are implemented as software, programs for executing these functions are stored in a storage unit (a memory such as a ROM or RAM) included in the HMD 100 or the PC 109. When a CPU included in the HMD 100 or the PC 109 executes the programs stored in the storage unit, functions provided by the functional units are implemented.

<Operation of System>

Figure 2:
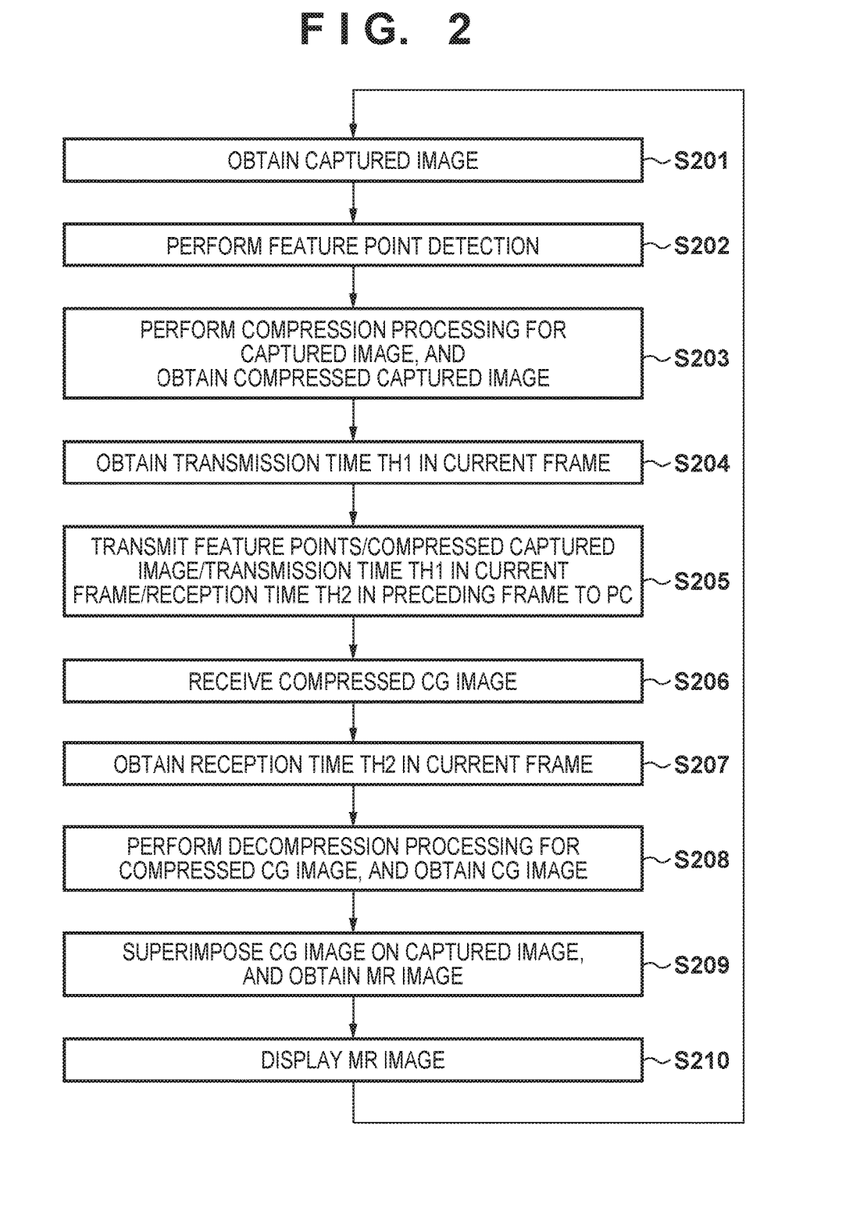
FIG. 2 is a flowchart for explaining the operation of an HMD according to the first embodiment.
Figure 3:
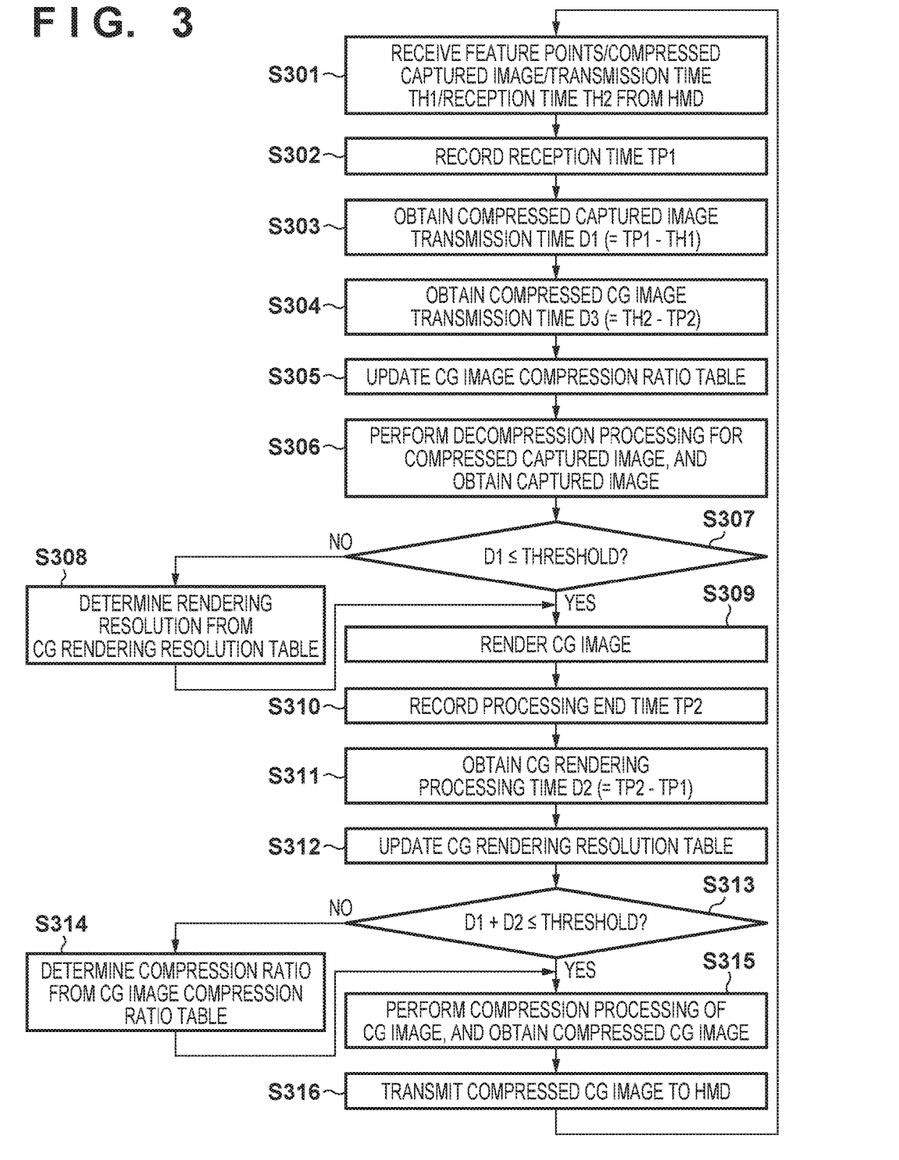
FIG. 3 is a flowchart for explaining the operation of a PC according to the first embodiment.

FIG. 2 is a flowchart for explaining the operation of the HMD 100 according to the first embodiment. FIG. 3 is a flowchart for explaining the operation of the PC 109 according to the first embodiment. Note that the following processing starts when, for example, a start instruction is accepted from the user.

In step S201, the image capturing unit 101 performs image capturing, and obtains an uncompressed captured image. In step S202, the feature point detection unit 102 performs feature point detection for the obtained captured image, and obtains feature points in the captured image. Furthermore, in step S203, the compression unit 103 performs the compression processing of the captured image, and obtains a compressed captured image.

In step S204, the transmission time obtaining unit 107 determines a transmission time TH1 at which the HMD 100 transmits the compressed captured image to the PC 109. In step S205, the wireless I/F unit 108 transmits, to the PC 109, the following information:
- compressed captured image
- feature points
- transmission time TH1 of compressed captured image of current frame
- reception time TH2 of compressed CG image for captured image of frame (to be referred to as preceding frame hereinafter) immediately before current frame Note that the reception time TH2 is information obtained in step S207 of a preceding loop which has processed the preceding frame.

In step S301, the wireless I/F unit 116 receives the pieces of information of the compressed captured image, feature points, transmission time TH1, and reception time TH2, which have been transmitted from the HMD 100 in step S205.

In step S302, the transmission time obtaining unit 115 obtains a reception time TP1 of the compressed captured image. In step S303, the transmission time obtaining unit 115 measures the compressed captured image transmission time D1 based on the reception time TP1 at which reception of the compressed captured image is completed and the transmission time TH1 obtained in step S302.

In step S304, the transmission time obtaining unit 115 obtains a compressed CG image transmission time D3 in the preceding frame. More specifically, the transmission time obtaining unit 115 derives the compressed CG image transmission time D3 based on the difference between the transmission time TP1 at which the PC 109 transmits the compressed CG image in the preceding frame and the reception time TH2 obtained by the transmission time obtaining unit 115 in step S301.

In step S305, the compression unit 113 adds/updates a record indicating the relationship between "the compression ratio of the CG image" and "the compressed CG image transmission time D3" included in a CG image compression ratio table. Note that if there is no CG image compression ratio table, a table is newly generated. The CG image compression ratio table is a table which holds records each indicating the relationship between "the compression ratio of a CG image" and "a compressed CG image transmission time D3" in each of a plurality of past frames. It is possible to estimate a compressed CG image transmission time for a compression ratio with reference to the CG image compression ratio table.

In step S306, the decompression unit 110 performs decompression processing for the compressed captured image, and obtains an image which nearly coincides with the image captured by the image capturing unit 101 of the HMD 100. In step S307, the transmission time obtaining unit 115 determines whether the compressed captured image transmission time D1 in the current frame is longer than a predetermined first time threshold. That is, the transmission time obtaining unit 115 determines whether a delay time when the PC 109 receives the compressed captured image is longer than the first time threshold. Note that the first time threshold is preferably determined based on, for example, the average value of the compressed captured image transmission times D1 in a state (that is, a normal state) in which the delay time in the wireless MR system falls within a predetermined range.

Note that the compressed captured image transmission time D1 may be evaluated by comparison with a single threshold or comparison with a plurality of thresholds. By performing comparison with a plurality of thresholds, it becomes possible to perform finer control in accordance with the delay time. More specifically, the rendering resolution of the CG image in step S309 (to be described later) can be changed in finer units.

Note that the first time threshold may be adaptively changed, instead of a fixed value. Since an allowable delay time becomes shorter by setting the threshold smaller, it is possible to perform control to shorten the delay time in the wireless MR system. If the threshold is set larger, the allowable delay time becomes longer but the quality of the CG image can be kept higher.

If it is determined in step S307 that the compressed captured image transmission time D1 in the current frame is longer than the first time threshold, the process advances to step S308; otherwise, the process advances to step S309.

In step S308, the CG rendering unit 112 determines the rendering resolution of the CG image from a CG rendering resolution table. The CG rendering resolution table is a table that holds records each indicating the relationship between "the rendering resolution of a CG image" and "the rendering processing time of the CG image" in each of a plurality of past frames. That is, it is possible to estimate a rendering processing time corresponding to a rendering resolution with reference to the CG rendering resolution table.

Note that in step S308, a rendering resolution lower than a preset normal rendering resolution is set. That is, if the compressed captured image transmission time D1 is longer than the first time threshold, rendering the CG image at the preset normal rendering resolution may make the delay time longer in the whole wireless MR system. To cope with this, by lowering the rendering resolution of the CG image, the time taken to perform the rendering processing of the CG image is shortened to reduce the delay time in the whole wireless MR system.

In step S309, the CG rendering unit 112 executes the rendering processing of the CG image for the captured image of the current frame. As described above, if it is determined that the compressed captured image transmission time D1 is equal to or shorter than the first time threshold, the CG image is rendered at the preset normal rendering resolution. On the other hand, if it is determined that the compressed captured image transmission time D1 is longer than the first time threshold, the CG image is rendered at a lower rendering resolution.

In step S310, the processing time obtaining unit 114 obtains a processing end time TP2 as the generation completion time of the CG image. In step S311, the processing time obtaining unit 114 obtains the CG rendering processing time D2 based on the difference between the reception time TP1 obtained in step S302 and the processing end time TP2 obtained in step S310.

In step S312, the record indicating the relationship between "the rendering resolution of the CG image" and "the rendering processing time of the CG image" in the CG rendering resolution table is updated using the obtained CG rendering processing time D2.

In step S313, the compression unit 113 obtains the sum of the compressed captured image transmission time D1 and the CG rendering processing time D2, that is, the delay time when the rendering processing of the CG image is completed. It is determined whether the current delay time (D1+D2) is longer than a predetermined second time threshold. If it is determined in step S313 that the current delay time (D1+D2) is longer than the second time threshold, the process advances to step S314; otherwise, the process advances to step S315.

In step S314, the compression unit 113 determines the compression ratio of the CG image from the CG image compression ratio table. Note that in step S314, a compression ratio higher than a preset normal compression ratio is set. That is, if the current delay time (D1+D2) is longer than the second time threshold, compressing the CG image at the preset normal compression ratio may make the delay time longer in the whole wireless MR system. To cope with this, by increasing the compression ratio of the CG image, the data amount of the compressed CG image is decreased, and the transmission time of the compressed CG image is shortened, thereby reducing the delay time in the whole wireless MR system.

In step S315, the compression unit 113 executes the compression processing of the CG image for the captured image of the current frame. As described above, if it is determined that the delay time (D1+D2) is equal to or shorter than the second time threshold, the CG image is compressed at the preset normal compression ratio. On the other hand, if it is determined that the delay time (D1+D2) is longer than the second time threshold, a CG image generated for a succeeding captured image is compressed at a higher compression ratio. In step S316, the wireless I/F unit 116 transmits the compressed CG image to the HMD 100.

In step S206, the wireless I/F unit 108 receives the compressed CG image from the PC 109. In step S207, the transmission time obtaining unit 107 obtains the time TH2 at which the compressed CG image is received in step S206. Note that the HMD reception time TH2 obtained by the transmission time obtaining unit 107 in step S207 is transmitted to the PC 109 in the processing of the next frame, and used by the PC 109 to obtain the compressed CG image transmission time D3.

In step S208, the decompression unit 104 executes decompression processing for the compressed CG image, and obtains the CG image generated by the PC 109 in step S309. In step S209, the composition unit 105 composites/superimposes the CG image obtained by the decompression unit 104 in step S208 on the captured image obtained by the image capturing unit 101 in step S201, thereby obtaining an MR image. In step S210, the display unit 106 displays, on a display, the MR image obtained by the composition unit 105 in step S209.

As described above, according to the first embodiment, at least one of the compression ratio and rendering resolution of the CG image is adaptively changed based on the compressed captured image transmission time D1 taken to transmit the compressed captured image and the CG rendering processing time D2. By executing the change control, it is possible to provide a satisfactory image while keeping the delay time in the wireless MR system within the predetermined range. That is, it is possible to maintain the delay time within the predetermined range without depending on a variation in a radio wave propagation environment or a change in the size of the CG image or the geometrical shape.

(Second Embodiment)

In the second embodiment, an arrangement of reducing a delay time based on a system delay time (the sum of the transmission delay of a compressed captured image in a preceding frame, the rendering delay of a CG image, and the transmission delay of a compressed CG image) will be described.

<System Arrangement>

Figure 4:
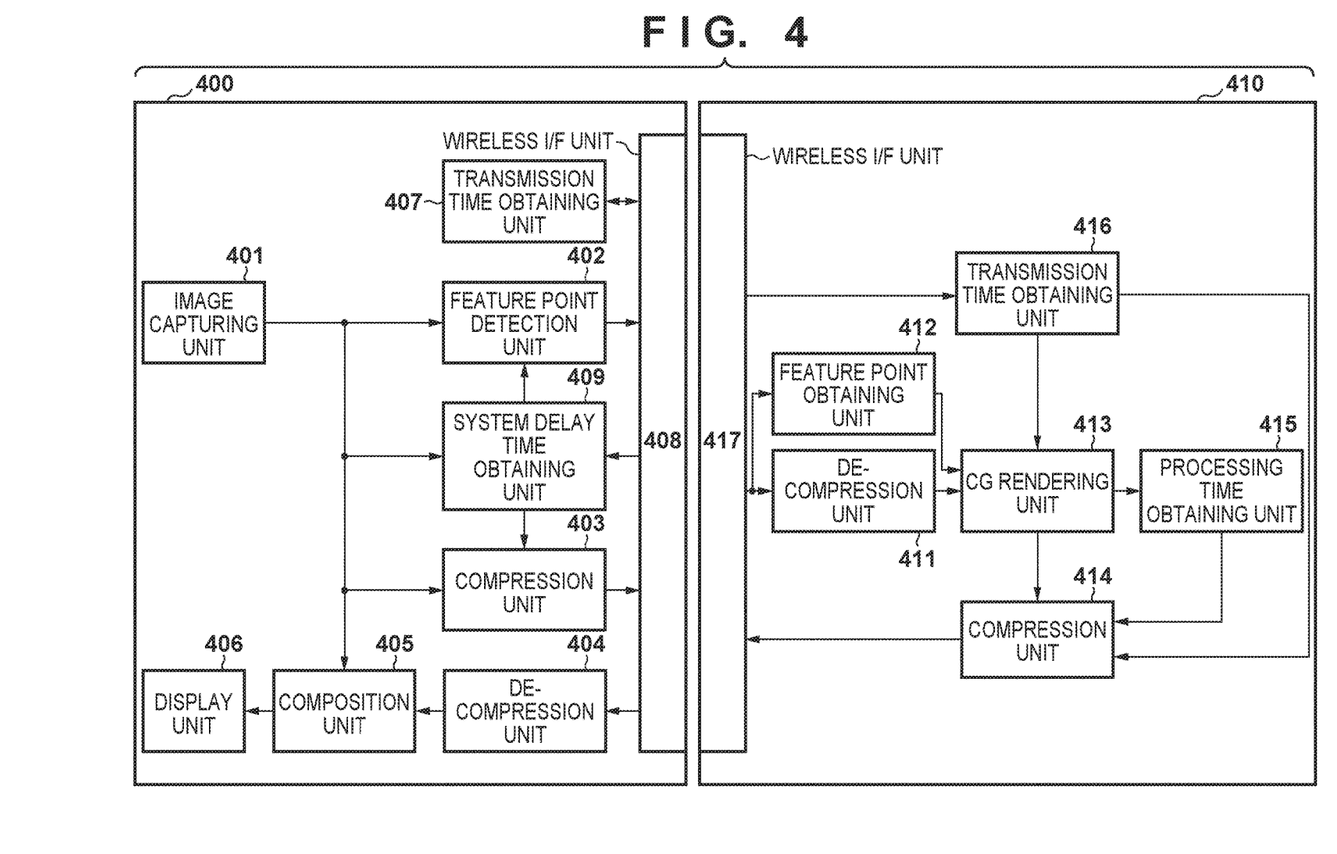
FIG. 4 is a block diagram showing the arrangement of an MR system according to the second and third embodiments.

FIG. 4 is a block diagram showing the arrangement of an MR system according to the second embodiment. With respect to the HMD 100 according to the first embodiment, an HMD 400 further includes a system delay time obtaining unit 409. The system delay time obtaining unit 409 measures a system delay time as a time from when the HMD 400 transmits a compressed captured image until the HMD 400 receives a compressed CG image. Note that the system delay time obtaining unit 409 may be configured to measure a time from when an image capturing unit 401 performs image capturing until a compressed CG image is received. The arrangement of a PC 410 is the same as that in the first embodiment and a description thereof will be omitted.

<Operation of System>

Figure 5:
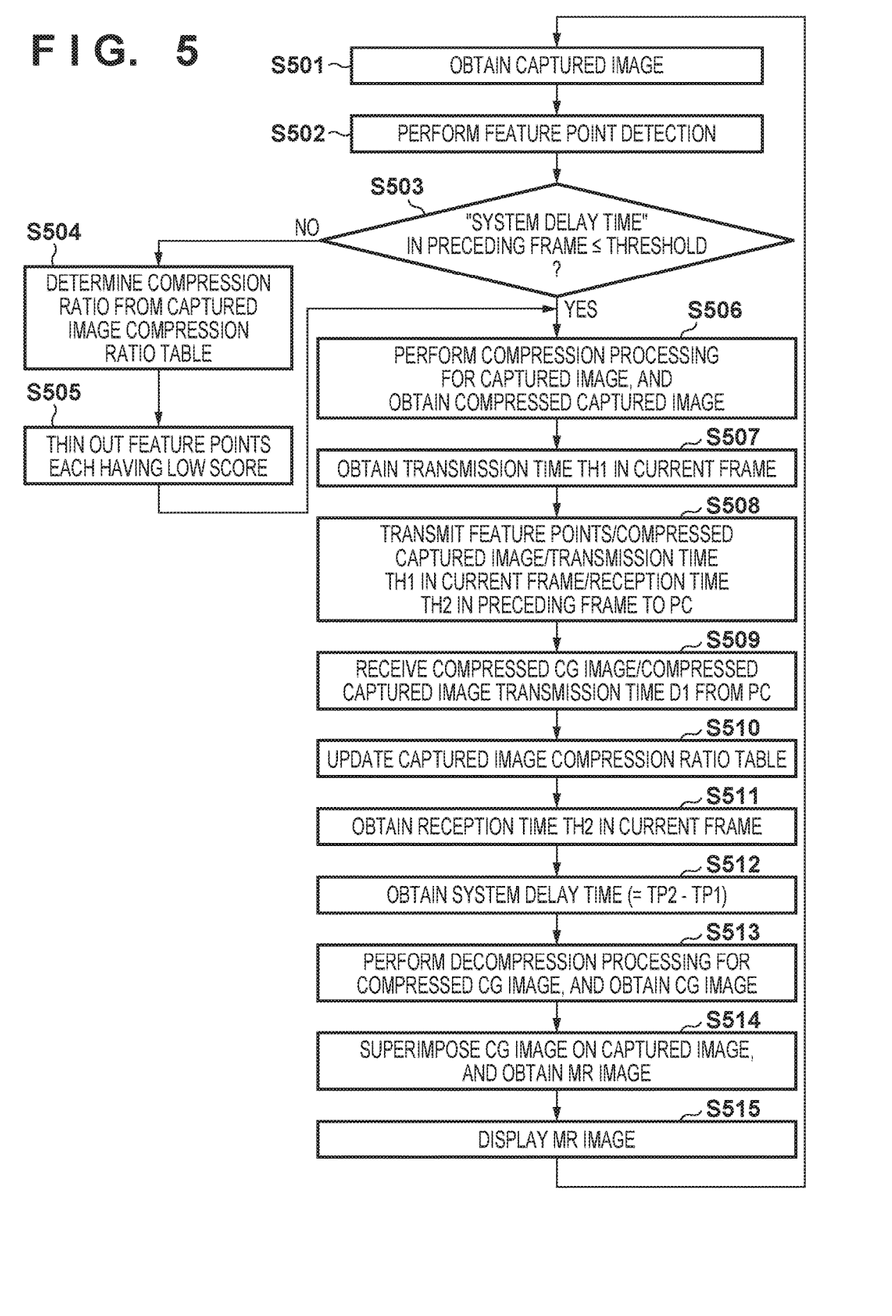
FIG. 5 is a flowchart for explaining the operation of an HMD according to the second embodiment.
Figure 6:
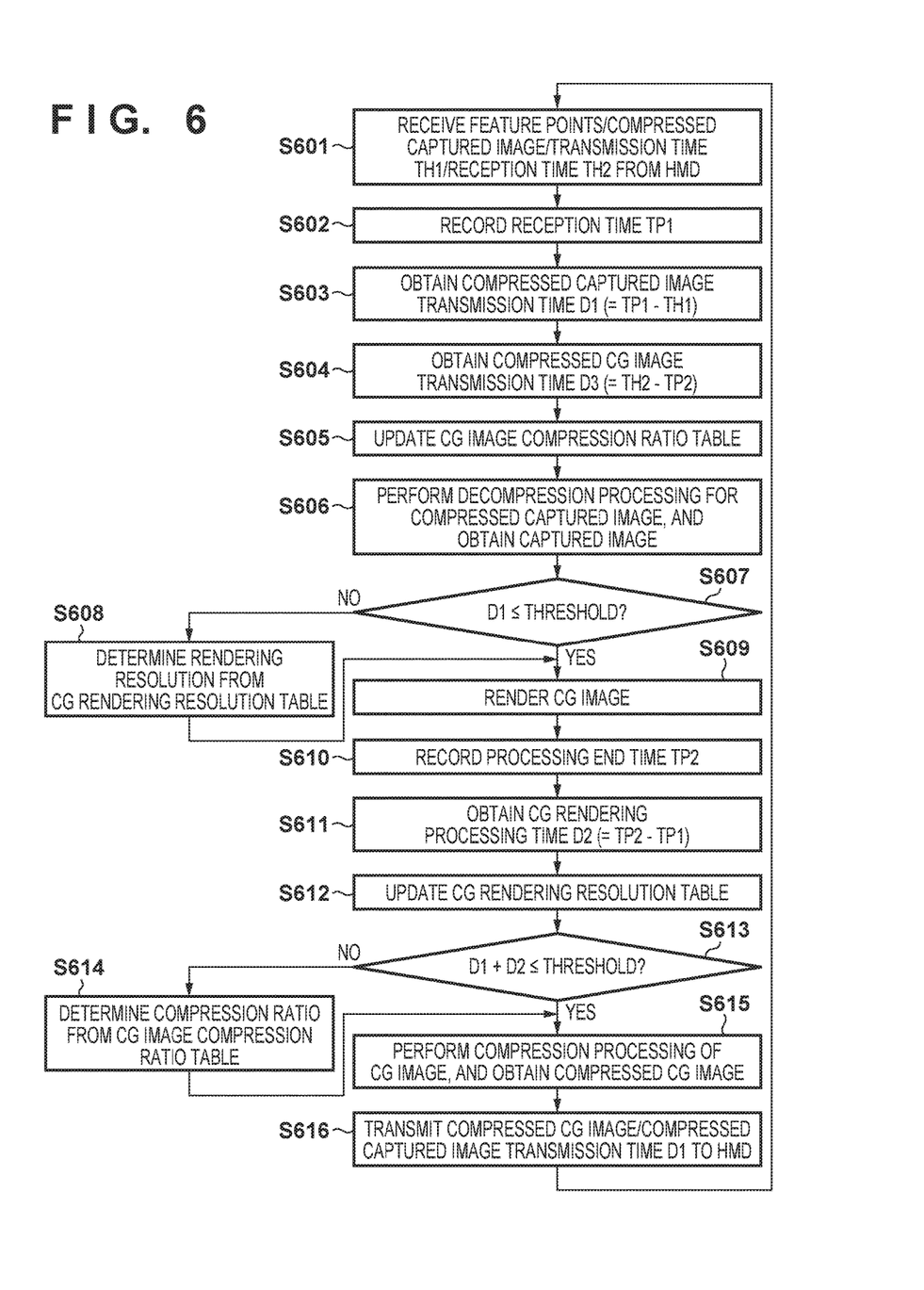
FIG. 6 is a flowchart for explaining the operation of a PC according to the second embodiment.

FIG. 5 is a flowchart for explaining the operation of the HMD 400 according to the second embodiment. FIG. 6 is a flowchart for explaining the operation of the PC 410 according to the second embodiment. Note that FIG. 6 is the same as the first embodiment (FIG. 3) except that a wireless I/F unit 417 transmits a compressed captured image transmission time D1 in addition to a compressed CG image in step S616, and a description thereof will be omitted.

In step S501, the image capturing unit 401 performs image capturing, and obtains an uncompressed captured image. In step S502, a feature point detection unit 402 performs feature point detection for the obtained captured image, and obtains feature points in the captured image.

In step S503, the system delay time obtaining unit 409 compares a system delay time in the preceding frame with a predetermined third time threshold. As described above, the system delay time is a time from a transmission time at which the HMD 400 transmits a compressed captured image to a reception time at which the HMD 400 receives a CG image. If it is determined in step S503 that the system delay time is longer than the third time threshold, the process advances to step S504 to change the compression ratio; otherwise, the process advances to step S506.

That is, a long system delay time indicates a decrease in wireless transmission rate caused by a deterioration in a radio wave propagation environment or an increase in a transmission data amount caused by a change in shape/size of the CG image.

In step S504, a compression unit 403 sets a compression ratio higher than a preset normal compression ratio based on a captured image compression ratio table. By changing the compression ratio of the captured image to a higher one to decrease the data amount of the compressed captured image, the time taken to transmit the compressed captured image is decreased, thereby reducing the system delay time.

Note that the captured image compression ratio table holds "the compression ratio of a captured image" and "a compressed captured image transmission time D1" in each of a plurality of past frames. It is possible to estimate the transmission time of the compressed captured image for the compression ratio with reference to the captured image compression ratio table.

In step S505, the compression unit 403 operates to distribute to a decrease in the transmission data amount, that is, a reduction in the system delay time by deleting some of the feature points detected by the feature point detection unit 402 in step S502. It is possible to add a score based on a luminance difference to each of the feature points obtained by a feature point detection technique such as FAST. Thus, to delete the feature points, a method of deleting feature points each having a low score can be used.

In step S506, the compression unit 403 performs the compression processing of the captured image, and obtains a compressed captured image. In step S507, a transmission time obtaining unit 407 determines a transmission time TH1 at which the HMD 400 transmits the compressed captured image. In step S508, a wireless I/F unit 408 transmits, to the PC 410, the following information:

compressed captured image feature points transmission time TH1 of compressed captured image of current frame reception time TH2 of compressed CG image for captured image of frame (to be referred to as preceding frame hereinafter) immediately before current frame Note that the reception time TH2 is information obtained in step S511 of a preceding loop which has processed the preceding frame.

The operation of the PC 410 is the same as in the first embodiment except that the wireless I/F unit 417 transmits the compressed captured image transmission time D1 in addition to the compressed CG image in step S616, and a description thereof will be omitted.

In step S509, the wireless I/F unit 408 receives the compressed CG image and the compressed captured image transmission time D1 from the PC 410. In step S510, a record indicating the relationship between "the compression ratio of the captured image" and "the compressed captured image transmission time D1" in the captured image compression ratio table is added/updated using the obtained compressed captured image transmission time D1.

The captured image compression ratio table is a table which holds records each indicating the relationship between "the compression ratio of a captured image" and "a compressed captured image transmission time D1" in each a plurality of past frames. It is possible to estimate a compressed captured image transmission time for a compression ratio with reference to the captured image compression ratio table.

In step S511, the transmission time obtaining unit 407 obtains the reception time TH2 at which the compressed CG image and the compressed captured image transmission time D1 are received in step S509. In step S512, a system delay time is obtained based on the reception time TH2 obtained in step S511 and the transmission time TH1 obtained in step S507.

In step S513, a decompression unit 404 performs decompression processing for the compressed CG image, and obtains a CG image generated by the PC 410 in step S609. In step S514, a composition unit 405 composites/superimposes the CG image obtained by the decompression unit 404 in step S513 on the captured image obtained by the image capturing unit 401 in step S501, thereby obtaining an MR image. In step S515, a display unit 406 displays, on a display, the MR image obtained by the composition unit 405 in step S514.

As described above, according to the second embodiment, in addition to the arrangement according to the first embodiment, the compression ratio of the captured image is adaptively changed based on the system delay time. By executing the change control, it is possible to provide a satisfactory image while keeping the delay time in the wireless MR system within a predetermined range.

(Third Embodiment)

In the third embodiment, another arrangement of reducing various delays by an HDM based on a system delay time will be described. The arrangements of an HMD 400 and a PC 410 are the same as those in the second embodiment and a description thereof will be omitted.

<Operation of System>

Figure 7:
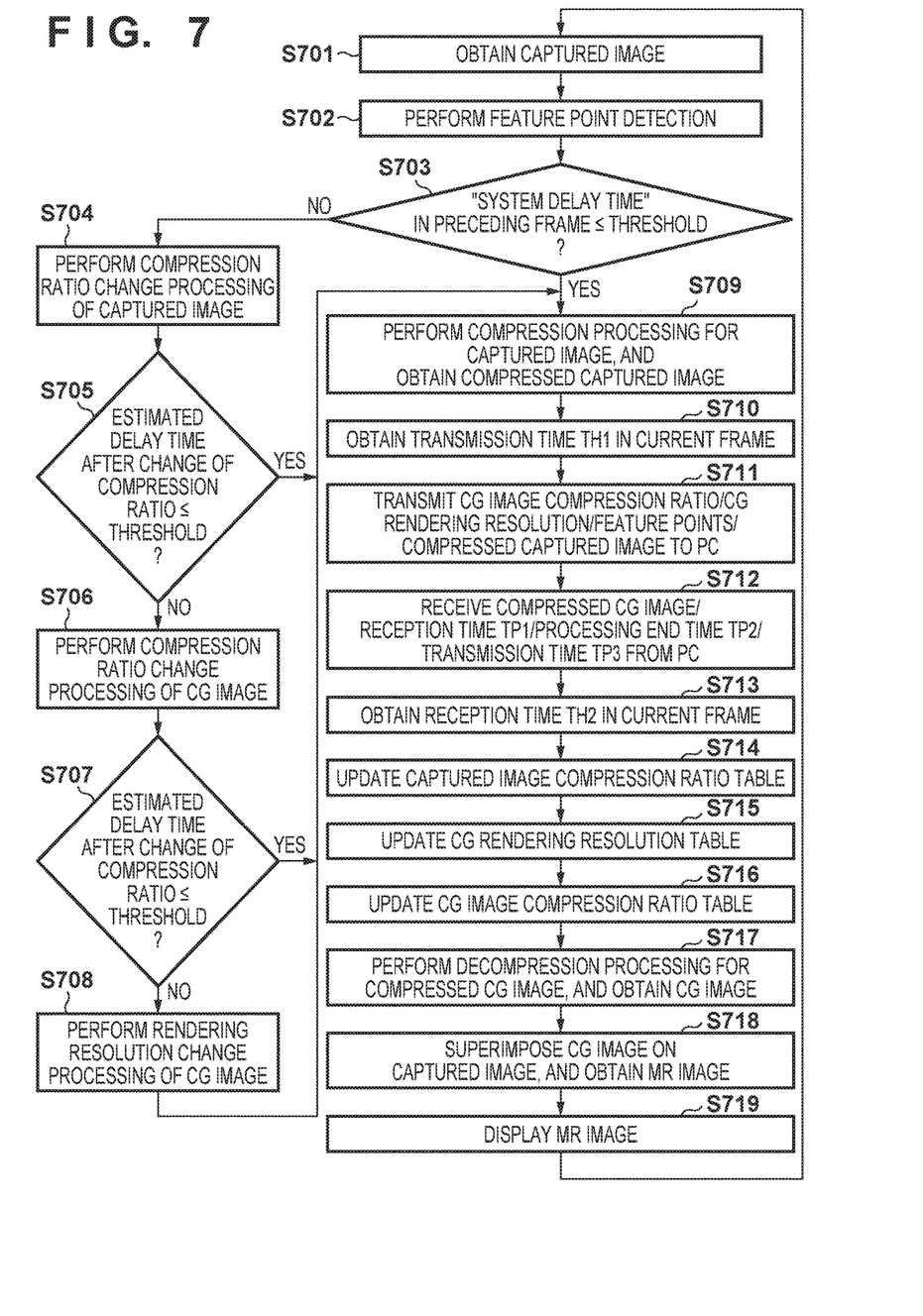
FIG. 7 is a flowchart for explaining the operation of an HMD according to the third embodiment.
Figure 8:
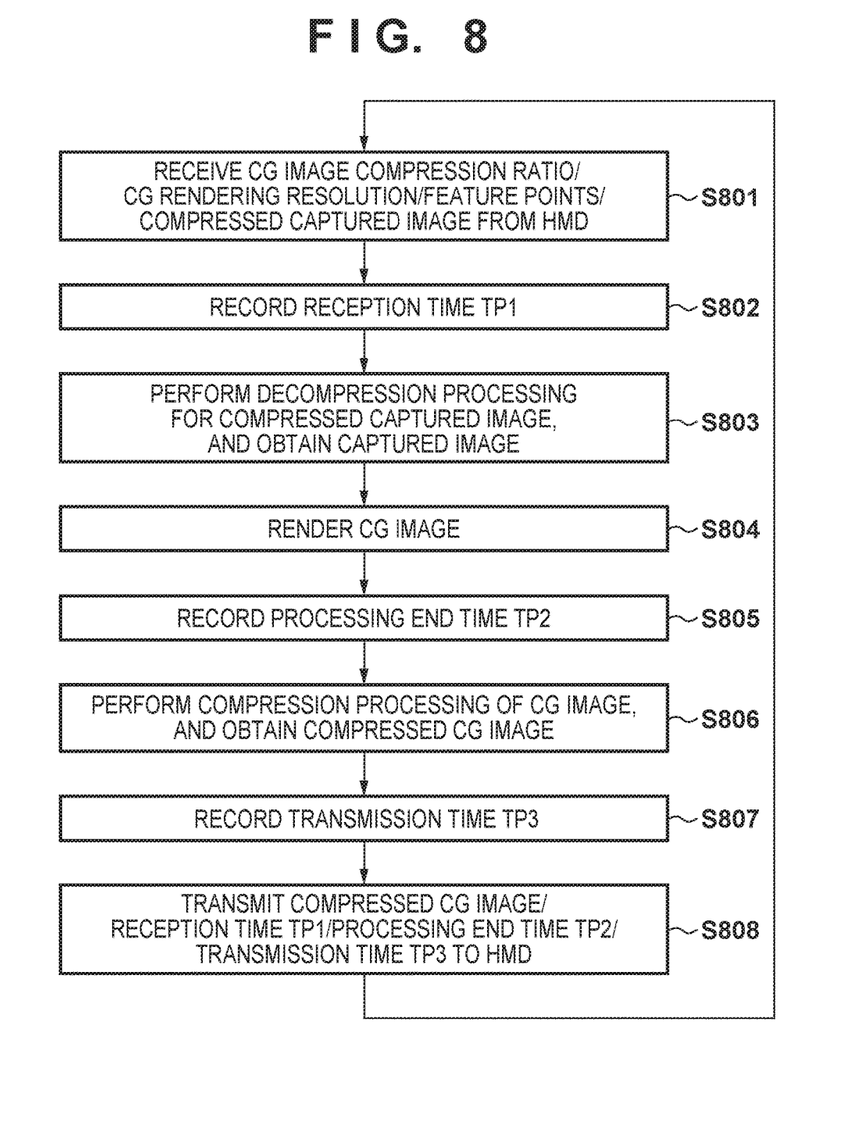
FIG. 8 is a flowchart for explaining the operation of a PC according to the third embodiment.

FIG. 7 is a flowchart for explaining the operation of the HMD 400 according to the third embodiment. FIG. 8 is a flowchart for explaining the operation of the PC 410 according to the third embodiment.

In step S701, an image capturing unit 401 obtains a captured image. In step S702, a feature point detection unit 402 performs feature point detection. In step S703, a system delay time obtaining unit 409 compares a system delay time in a preceding frame with a predetermined fourth threshold. As described above, the system delay time is a time from a transmission time at which the HMD 400 transmits a compressed captured image to a reception time at which the HMD 400 receives a CG image. If it is determined in step S703 that the system delay time is longer than the fourth threshold, the process advances to step S704; otherwise, the process advances to step S709.

In step S704, a compression unit 403 changes the compression ratio of the captured image. First, the system delay time obtaining unit 409 calculates the transmission allowable time of the compressed captured image by:

transmission allowable time of compressed captured image=system allowable delay time−($CG$ rendering processing time $D2$ in preceding frame+compressed $CG$ image transmission time $D3$ in preceding frame)

The system allowable delay time is, for example, the time from when the HMD obtains a captured image until the HMD displays an MR image. By setting the system allowable delay time shorter, it is possible to control a delay time to be shorter. On the other hand, by setting the system allowable delay time longer, it is possible to control to perform an operation while keeping high image quality. Furthermore, as the CG rendering processing time D2 and the compressed CG image transmission time D3 in the preceding frame are longer, control is executed to reduce the compressed captured image transmission time D1.

The system delay time obtaining unit 409 determines the compression ratio of the captured image with reference to a captured image compression ratio table not to exceed the transmission allowable time of the compressed captured image. Note that if the transmission allowable time of the compressed captured image is exceeded even by setting the compression ratio to a maximum value, the compression ratio of the captured image is set to the settable maximum value.

By changing the compression ratio of the captured image to a higher one, the data amount of the compressed captured image is decreased, thereby making it possible to shorten the compressed captured image transmission time D1. In this case, however, the quality of the captured image obtained by executing the decompression processing in the PC 410 deteriorates. For example, in the JPEG method, if compression processing is performed at a high compression ratio, block noise which loses continuity at the boundary of images, mosquito noise which is caused by removing a high-frequency component, or the like occurs. The maximum value of the compression ratio in the compression processing is preferably determined depending on the image quality of the captured image required by the PC and MR system.

In step S705, the system delay time obtaining unit 409 derives a system delay time when the compression ratio of the captured image is changed in step S704. That is, the system delay time obtaining unit 409 derives the system delay time based on the compressed captured image transmission time D1 after the change of the compression ratio, the CG rendering processing time D2 in the preceding frame, and the compressed CG image transmission time D3 in the preceding frame. Note that the captured image transmission time D1 after the change of the compression ratio is preferably estimated with reference to the captured image compression ratio table. If it is determined in step S705 that the derived system delay time is longer than the fourth threshold, the process advances to step S706; otherwise, the process advances to step S709.

In step S706, the HMD 400 changes the compression ratio of the CG image generated in the PC 410. First, the system delay time obtaining unit 409 calculates the transmission allowable time of the compressed captured image by:

transmission allowable time of compressed captured image=system allowable delay time−(*CG* rendering processing time *D*2 in preceding frame+compressed captured image transmission time *D*1 at changed compression ratio)

The system delay time obtaining unit 409 determines the compression ratio of the captured image with reference to a CG image compression ratio table not to exceed the transmission allowable time of the compressed CG image. Similarly to the case of the compressed captured image, if the transmission allowable time of the compressed CG image is exceeded even by setting the compression ratio to the maximum value, the compression ratio of the CG image is set to the settable maximum value.

In step S707, the system delay time obtaining unit 409 derives a system delay time when the compression ratio of the CG image is changed in step S706. That is, the system delay time obtaining unit 409 derives the system delay time based on the compressed captured image transmission time D1 after the change of the compression ratio, the CG rendering processing time D2 in the preceding frame, and the compressed CG image transmission time D3 after the change of the compression ratio. Note that the CG image transmission time D3 after the change of the compression ratio is preferably estimated with reference to the CG image compression ratio table. If it is determined in step S707 that the derived system delay time is longer than the fourth threshold, the process advances to step S708; otherwise, the process advances to step S709.

In step S708, the HMD 400 changes the rendering resolution of the CG image generated in the PC 410. First, the system delay time obtaining unit 409 calculates the allowable time of the CG rendering processing by:

allowable time of *CG* rendering processing=system allowable delay time−(compressed captured image transmission time *D*1 at changed compression ratio+compressed *CG* image transmission time *D*3 at changed compression ratio)

The system delay time obtaining unit 409 determines the rendering resolution of the CG image with reference to a CG rendering resolution table not to exceed the allowable time of the CG rendering processing.

In step S709, the compression unit 403 performs the compression processing of the captured image, and obtains a compressed captured image.

In step S710, a transmission time obtaining unit 407 determines a time TH1 at which pieces of information of the compressed captured image, CG image compression ratio, and CG rendering resolution are transmitted. In step S711, a wireless I/F unit 408 transmits the compressed captured image, CG image compression ratio, CG rendering resolution, and feature points.

In step S801, a wireless I/F unit 417 receives the compressed captured image, CG image compression ratio, CG rendering resolution, and feature points. In step S802, the transmission time obtaining unit 416 obtains a reception time TP1 at which the various kinds of information are received in step S801.

In step S803, a decompression unit 411 performs decompression processing for the compressed captured image, and obtains an image captured by the HMD 400 in step S701. In step S804, a CG rendering unit 413 performs the rendering processing of the CG image based on the rendering resolution which has been determined by the HMD 400 and received by the PC 410 in step S801.

In step S805, a processing time obtaining unit 415 obtains a processing end time TP2 at which CG rendering is completed. In step S806, a compression unit 414 performs the compression processing of the CG image based on the CG image compression ratio which has been determined by the HMD 400 and received by the PC 410 in step S801.

In step S807, a transmission time obtaining unit 416 obtains a transmission time TP3 at which the compressed CG image, reception time TP1, and processing end time TP2 are transmitted. In step S808, the wireless I/F unit 417 transmits, to the HMD 400, the following information:

compressed CG image
reception time TP1
processing end time TP2
transmission time TP3

In step S712, the wireless I/F unit 408 receives the compressed CG image, reception time TP1, processing end time TP2, and transmission time TP3 from the PC 410. In step S713, the transmission time obtaining unit 407 obtains a reception time TH2 at which the various kinds of information are received in step S712.

In steps S714 to S716, the captured image compression ratio table, CG image compression ratio table, and CG rendering resolution table are respectively updated. That is, the respective tables are updated based on the wireless transmission and wireless reception times of the HMD 400 and PC 410 and the CG rendering processing time in the PC 410.

In step S717, a decompression unit 404 performs decompression processing for the compressed CG image, and obtains the CG image generated by the PC 410 in step S805. In step S718, a composition unit 405 composites/superimposes the CG image obtained by the decompression unit 404 in step S717 on the captured image obtained by the image capturing unit 401 in step S701, thereby obtaining an MR image. In step S719, a display unit 406 displays, on a display, the MR image obtained by the composition unit 405 in step S718.

As described above, according to the third embodiment, the compression ratio of the captured image, the compression ratio of the CG image, and the rendering resolution of the CG image are sequentially, adaptively changed based on the system delay time. By executing the change control, it is possible to reduce the delay time in the whole system while preferentially keeping the CG rendering resolution of predetermined quality or higher.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-115035, filed Jun. 5, 2015, which is hereby incorporated by reference herein in its entirety.

What is claimed is:

1. A communication apparatus wirelessly communicable with another communication apparatus, comprising:
   one or more processors; and
   at least one memory coupled to the one or more processors, the at least one memory having instructions stored thereon which, when executed by the one or more processors, cause the communications apparatus to:
      receive, by wireless communication, a compressed captured image transmitted from the other communication apparatus, wherein the compressed captured image is obtained by compressing a captured image;
      decompress the compressed captured image to obtain a decompressed captured image;
      generate, based on the decompressed captured image, a CG image to be superimposed and displayed on the captured image;
      compress the CG image to generate a compressed CG image;
      transmit the compressed CG image to the other communication apparatus by wireless communication;
      derive, based on a transmission time point of the compressed captured image in the other communication apparatus and a generation duration measured between a processing start time point and a processing end time point of generating the generated CG image, a time duration from when the compressed captured image is transmitted by the other communication apparatus until when the CG image is generated; and
      change a compression ratio of the CG image compression based on whether the derived time duration is longer than a predetermined threshold, wherein the compression ratio is set further based on a transmission time duration of a compressed CG image for a preceding captured image.

2. The apparatus according to claim 1, wherein in changing the compression ratio, the at least one memory further includes instructions stored thereon which, when executed by the one or more processors, cause the communication apparatus to, if the derived time duration is longer than the predetermined threshold, change the compression ratio of the CG image compression to a compression ratio higher than that if the derived time duration is not longer than the predetermined threshold.

3. The apparatus according to claim 1, wherein in deriving the time duration, the at least one memory further includes instructions stored thereon which, when executed by the one or more processors, cause the communication apparatus to:
   derive a first delay time duration taken for wireless communication of the compressed captured image from the other communication apparatus to the communication apparatus based on the transmission time point of the compressed captured image and a reception time point of the compressed captured image by the communication apparatus, and
   derive a second delay time duration taken for generation of the CG image based on the reception time point of the compressed captured image by the communication apparatus and the generation duration of the generated CG image.

4. The apparatus according to claim 3, wherein the at least one memory further includes instructions stored thereon which, when executed by the one or more processors, cause the communication apparatus to:
   change a resolution of the CG image generation based on whether the first delay time duration is longer than a first threshold, and
   change the compression ratio of the CG image compression based on whether a sum of the first delay time duration and the second delay time duration is longer than a second threshold.

5. The apparatus according to claim 4, wherein the at least one memory further includes instructions stored thereon which, when executed by the one or more processors, cause the communication apparatus to:
   generate a CG rendering resolution table indicating a relationship between the second delay time duration and a resolution when the compressed CG image is generated,
   wherein in generating the CG image, the resolution of the CG image is changed based on the CG rendering resolution table.

6. The apparatus according to claim 3, wherein the at least one memory further includes instructions stored thereon which, when executed by the one or more processors, cause the communication apparatus to:

derive a third delay time duration taken for wireless communication of the compressed CG image from the communication apparatus to the other communication apparatus based on a transmission time point of the compressed CG image in the communication apparatus and a reception time point of the compressed CG image in the other communication apparatus; and generate a CG image compression ratio table indicating a relationship between the third delay time duration and a compression ratio when the CG image is compressed, wherein in compressing the CG image, the compression ratio of the CG image is changed based on the CG image compression ratio table.

7. The apparatus according to claim 1, wherein
the other communication apparatus is configured as a video see-through type head-mounted display (HMD), and the at least one memory further includes instructions stored thereon which, when executed by the one or more processors, cause the communication apparatus to receive a captured image obtained by an image capturing unit of the other communication apparatus.

8. A control method for a communication apparatus wirelessly communicable with another communication apparatus, comprising:

receiving, by wireless communication, a compressed captured image obtained by compressing a captured image transmitted from the other communication apparatus, wherein the compressed captured image is obtained by compressing a captured image;

decompressing the compressed captured image to obtain a decompressed captured image;

generating, based on the decompressed captured image, a CG image to be superimposed and displayed on the captured image;

compressing the CG image to generate a compressed CG image;

transmitting the compressed CG image to the other communication apparatus by wireless communication;

deriving, based on a transmission time point of the compressed captured image in the other communication apparatus and a generation duration measured between a processing start time point and a processing end time point of generating the CG image in the generating, a time duration from when the compressed captured image is transmitted by the other communication apparatus until when the CG image is generated by the generating; and changing a compression ratio of the CG image in the compressing based on whether the time duration derived in the deriving is longer than a predetermined threshold, wherein the compression ratio is set further based on a transmission time duration of a compressed CG image for a preceding captured image.

9. A non-transitory computer-readable recording medium storing a computer program that, when executed by a computer, causes the computer to function as a communication apparatus wirelessly communicable with another communication apparatus, the program causing the communication apparatus to perform steps comprising:

receiving, by wireless communication, a compressed captured image transmitted from the other communication apparatus, wherein the compressed capture image is obtained by compressing a captured image;

decompressing the compressed captured image to obtain a decompressed captured image;

generating, based on the decompressed captured image, a CG image to be superimposed and displayed on the captured image;

compressing the CG image to generate a compressed CG image;

transmitting the compressed CG image to the other communication apparatus by wireless communication;

deriving, based on a transmission time point of the compressed captured image in the other communication apparatus and a generation duration measured between a processing start time point and a processing end time point of generating the CG image in the generating, a time duration from when the compressed captured image is transmitted by the other communication apparatus until when the CG image is generated by the generating; and changing a compression ratio of the CG image in the compressing based on whether the time duration derived by the deriving is longer than a predetermined threshold, wherein the compression ratio is set further based on a transmission time duration of a compressed CG image for a preceding captured image.

* * * * *